United States Patent Office 2,894,983
Patented July 14, 1959

2,894,983
SUCCINIC ACID ESTERS

Herbert Arnold, Bielefeld, and Norbert Brock, Wadersloh, Germany, assignors to Asta-Werke Aktiengesellschaft Chemische Fabrik, Brackwede, Westphalia, Germany No Drawing. Application February 18, 1958
Serial No. 715,862

Claims priority, application Germany February 23, 1957

3 Claims. (Cl. 260—485)

This invention relates to new choleretically active compounds and the production thereof.

The new compounds have the following general Formula I:

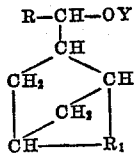

in which R represents an alkyl radical with an aliphatic chain containing 1-4 carbon atoms, $R_1$ represents one of the two groups —CH=CH— and —$CH_2$—$CH_2$—, Y represents a member of the group consisting of the hydrogen atom and the radicals

—CO—$CH_2$—$CH_2$—COOX and X represents a member of the group consisting of the hydrogen atom and the salt-forming radicals, preferably the alkali metals.

The aliphatic chain of the alkyl radicals R may be straight or branched.

If Y in the above general Formula I represents a hydrogen atom, the general Formula I comprises the secondary alcohols of the general Formulae II and III.

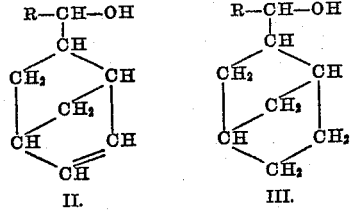

in which R has the meaning indicated above.

If Y in the general Formula I represents the radical —CO—$CH_2$—$CH_2$—COOX, the general formula I comprises the succinic acid semi-esters of the aforementioned carbinols and their salts with therapeutically utilisable bases, preferably the alkali metals. The carbinols, the succinic acid semi-esters and the salts thereof have a cholagogue action. However, the carbinols have an oily consistency and consequently are unsuitable for the manufacture of the conventional forms of medicines, such as tablets or lozenges. Another disadvantage of the carbinols is that they are insoluble in aqueous medium. The succinic acid semi-esters and the salts thereof are of solid consistency. The salts, especially the alkali metal salts have a good solubility in water. In addition, the semi-esters and their salts are practically odourless.

As regards their cholagogue action, the carbinols and their succinic acid semi-esters are superior to the known phenyl alkyl carbinols of the following general Formula IV:

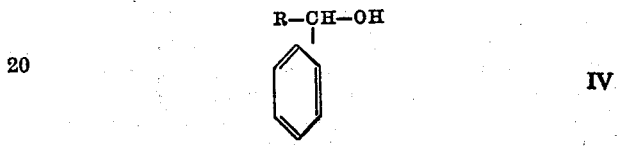

(see, for R=methyl, W. Kalow, Arch. exper. Path. and Pharmakol. 207, pages 696–702 (1949)).

By carrying out comparative pharmacological tests, its was established that the choleretic action with a compound of the general Formula II wherein R represents a methyl radical is increased two-fold as compared with the comparable compound of Formula IV wherein R represents a methyl radical, whereas, with a compound of the general Formula III wherein R represents a methyl radical, a therapeutically desirable longer effective period is obtained as compared with the corresponding product of Formula IV, with like effective intensity. The effective period of compound III (R=methyl) is about three hours and of compound IV (R=methyl) about two hours. Since the toxicities of the known substance IV in which R represents a methyl radical and of the new substances are substantially the same, the result is that the therapeutic range is increased for the new compounds of the general Formulae II and III. The same applies as regards the succinic acid semi-esters and their salts.

The following table shows the $DL_{50}$ values and the $DE_{1.5}$ values and also the therapeutic index for a compound in accordance with the invention, namely, the sodium salt of the succinic acid semi-ester described in Example 6, as compared with the prior known phenyl ethanol and the prior known sodium salt of β-[1-methoxy-4-naphthoyl]-propionic acid (indicated in the table as Product II).

TABLE

| Product | $DL_{50}$ I.P., mmol./kg. | $DL_{50}$ Intraduodenal, mmol./kg. | $DE_{1.5}$ I.P., mmol./kg. | $DL_{50}/DE_{1.5}$ therapeut. index I.P. | $DL_{50}/DE_{1.5}$ therapeut. index enteral |
|---|---|---|---|---|---|
| Example 6 | 4.2 | ≈31.6 | 0.16 | 26 | 175 |
| Phenylethanol | 5.1 | 28.7 | 0.38 | 12 | 75 |
| II | ≈1.8 | | 0.32 | 6 | |

The second vertical column of the table shows the $DL_{50}$ values with an intraperitoneal dose. The amount of 4.2 mmol./kg. corresponds approximately to 1 g./kg.

The third vertical column shows the $DL_{50}$ values with an intraduodenal dose. The quantity of 31.6 mmol./kg. corresponds to a quantity of about 7.5 g./kg.

The fourth vertical column shows the $DE_{1.5}$ values. What is meant here is the dosis efficax, i.e. the effective dose which increases the gall secretion in two hours to 1.5 times its former value (150% of its former value).

The fifth and sixth vertical columns show the therapeutic indices, i.e. the ratio between the lethal dose ($DL_{50}$) and the effective dose ($DE_{1.5}$). The higher the index, the lower the toxicity of the substance.

The compounds of the general Formula I can be obtained in accordance with the invention by the following methods:

A. By reacting Grignard compounds (V) with endomethylene-2.5-tetrahydro-$\Delta^3$-benzaldehyde (VI) (Ann. der Chemie, 460, 105 [1928]):

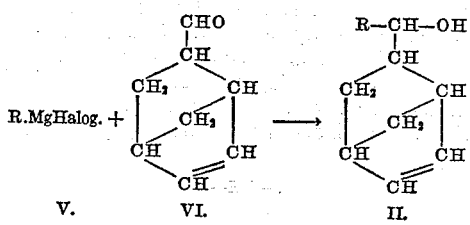

B. From the endomethylene-2.5-tetrahydro-$\Delta^3$-phenylhalides (VII) readily available by diene synthesis (Ann. der Chem. 543, 24 [1940]), by converting these halides into the Grignard compounds (VIII) and reacting these compounds with aldehydes of the general formula R—CHO:

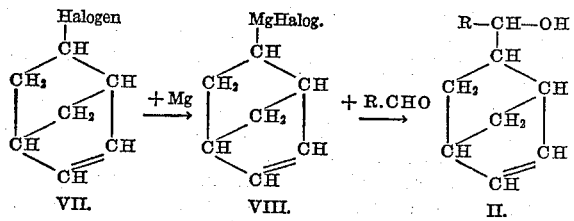

C. From the 2-acyl-bicyclo-(2,2,1)-hept-5-enes (IX) readily obtainable by diene synthesis (Chem. Zbl. 1948/I, page 320) from cyclopentadiene and vinyl alkyl ketones by reduction of these heptenes by the method of Meerwein and Ponndorf with aluminum isopropylate in isopropyl alcohol:

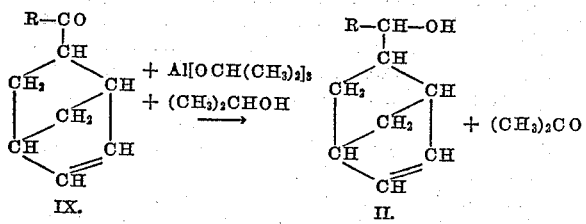

The saturated derivatives of the compounds II, which derivatives are characterised by the general Formula III, can be produced by catalytic hydrogenation of the compounds II. They can alternatively be obtained from the compounds of the general Formulae VI, VII and IX, by hydrogenation of these compounds if necessary and subjecting the resulting compounds to the reactions A, B or C.

The succinic acid semi-esters are obtained by addition of succinic acid anhydride to the carbinols of the general Formula I. The reaction products obtained in this way have in many cases initially an oily consistency; careful working up and purification, however, produces crystalline products. The salts can for example be obtained by dissolving the acid semi-esters in aqueous solutions of the salt-forming bases.

The following examples further illustrate the invention:

Example 1

A solution of 160 g. of 2.5-endomethylene-$\Delta^3$-cyclohexene aldehyde-(1) is added dropwise to a Grignard solution prepared from 35 g. of magnesium powder and 187 g. of methyl iodide in ether. When the reaction has ended, heating is continued for 10 minutes on a water bath. The resulting reaction solution then has added thereto an ice-cold aqueous solution of 170 g. of ammonium chloride, and the resulting α-(2.5-endomethylene-$\Delta^3$-cyclohexene)-ethanol (of the general Formula II in which $R=CH_3$) is isolated by extraction with ether and purified by distillation (B.P. 11 mm.=82–84° C.). Yield: 150 g.=84% of the theoretical.

Example 2

A Grignard solution prepared from 33 g. of magnesium and 135 g. of ethyl bromide in 500 ml. of absolute ether and a solution of 150 g. of 2.5-endomethylene-$\Delta^3$-tetrahydrobenzaldehyde and 150 ml. of absolute ether are mixed as in Example 1. The result is 135 g. of α - (2.5 - endomethylene - $\Delta^3$ - tetrahydrophenyl) - propanol (of the general Formula II in which $R=C_2H_5$); B.P. 12 mm.=92–94° C. Yield: 135 g.=72.5% of the theoretical.

Example 3

As described in Example 1, 100 g. of α-(2.5-endomethylene-$\Delta^3$-tetrahydrophenyl)-isobutanol (of the general Formula II in which $R=(CH_3)_2CH$—) are obtained by a Grignard reaction from 23 g. of magnesium and 105 g. of isopropyl bromide and 104 g. of 2.5-endomethylene - $\Delta^3$ - tetrahydrobenzaldehyde in ethereal solution. Yield: 100 g.=71% of the theoretical; B.P. 12 mm.=90–96° C.; M.P.=90° C.

Example 4

149 g. of α - (2.5 - endomethylenehexahydrophenyl)-ethanol (of the general Formula III in which $R=CH_3$) are obtained from 150 g. of α-(2.5-endomethylene-$\Delta^3$-tetrahydrophenyl)-ethanol (Example 1) in the presence of Raney nickel at 50° C. and a hydrogen pressure of 100 atm. in methanolic solution. B.P. 12 mm.=87–88° C. Yield: 98% of the theoretical.

Example 5

Under the conditions indicated in Example 4, 148 g. of α-(2.5-endomethylenehexahydrophenyl)-propanol (of the General Formula III in which $R=C_2H_5$) are obtained from 150 g. of the corresponding initial material (Example 2). B.P.=95–96° C. Yield: 98.6% of the theoretical.

Example 6

330 g. (2.4 mols) of α-(2.5-endomethylene-$\Delta^3$-tetrahydrophenyl)-ethanol are mixed with 200 g. (2 mols) of succinic acid anhydride and 600 ml. of absolute toluene and the mixture is heated for 16 hours to the boiling point while stirring. 600 ml. of ether are added to the cooled reaction solution and the toluene-ether mixture is submitted to extraction with dilute sodium hydroxide solution, with ice cooling, to isolate the succinic acid semi-ester. The aqueous alkali solution is then acidified again with HCl while cooling with ice and the succinic acid semi-ester liberated is extracted with ether. The ethereal solution of the ester is dried over $Na_2SO_4$. After evaporation of the ether, the residue is subjected to vacuum fractionation. B.P. 0.9 mm.=170—172° C.; distillation yield: 323 g.=68% of the theoretical.

This distillate is a viscous oil containing a few crystals. It is dissolved in 1000 ml. of petroleum ether and kept for 24 hours in a refrigerator. After this time, the succinic acid semi-ester has precipitated as a white powder. This is filtered off with suction and washed with a small quantity of pure petroleum ether. The powder obtained is dried in vacuo at room temperature. Yield: 295 g.=62% of the theoretical; M.P.=58–60° C.

The ester dissolves well in ether, acetone, and alcohol sparingly in ligroin and is insoluble in petroleum ether. If an equivalent quantity of sodium hydroxide is added, the product dissolves in water.

*Example 7*

A solution of 44 g. acetaldehyde in 100 ml. ether is added dropwise to a Grignard solution prepared from 26.7 g. of magnesium powder and 128.5 g. of 2.5-endomethylene-Δ³-cyclohexene-chloride in 450 ml. ether. In order to accelerate the reaction the mixture is stirred. When the reaction has ended ice-water and ammonium chloride are added to the reaction mixture which is worked up as described before. An oil is obtained; B.P. 12 mm.=89–91° C.; yield: 70 g.=50.7% of the theoretical.

*Example 8*

40.8 g. 2.5-endomethylene-Δ³-cyclohexenyl-methyl-ketone are reduced with 180 ml. of molar solution of aluminium-isopropylate in isopropanol. The isopropanol is then distilled off. The residue is hydrolysed with dilute soda lye. The carbinol thus obtained is worked up in vacuo and fractionated. B.P. 11 mm.=87–88° C.; yield 30 g.=73% of the theoretical.

What we claim is:
1. The compounds of the formula

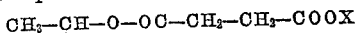
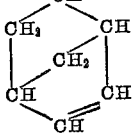

wherein

X indicates a member selected from the group consisting of hydrogen and an alkali metal.

2. The succinic acid semi-ester of α-(2,5-endomethylene-Δ³-tetrahydrophenyl) ethanol.

3. The sodium salt of the succinic acid semi-ester of α-(2,5-endomethylene-Δ³-tetrahydrophenyl) ethanol.

References Cited in the file of this patent
UNITED STATES PATENTS
2,435,403    Morris et al. _____ Feb. 3, 1948

OTHER REFERENCES

Alder et al.: Chemical Abstracts 32, 9056 (1938).
Chemical Abstracts 43, 10786 (1949).